United States Patent
Hunwardsen (10) Patent No.: US 12,345,893 B2
(45) Date of Patent: Jul. 1, 2025

(54) HOT MIRROR OPTICAL CAVITY AND INFIELD ILLUMINATION

(71) Applicant: Meta Platforms Technologies, LLC, Menlo Park, CA (US)

(72) Inventor: Matthew Thomas Hunwardsen, Moorpark, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/383,717

(22) Filed: Oct. 25, 2023

(65) Prior Publication Data

US 2024/0219721 A1   Jul. 4, 2024

Related U.S. Application Data

(60) Provisional application No. 63/435,675, filed on Dec. 28, 2022.

(51) Int. Cl.
| | |
|---|---|
| *G02B 27/01* | (2006.01) |
| *G02B 1/118* | (2015.01) |
| *G02B 5/20* | (2006.01) |
| *G02B 5/26* | (2006.01) |
| *G02B 27/00* | (2006.01) |

(52) U.S. Cl.
CPC .......... *G02B 27/0172* (2013.01); *G02B 1/118* (2013.01); *G02B 5/208* (2013.01); *G02B 5/26* (2013.01); *G02B 27/0093* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,585,477 B1 * | 3/2020 | Cavin | G06F 3/013 |
| 10,838,132 B1 | 11/2020 | Calafiore et al. | |
| 10,852,544 B1 * | 12/2020 | Zhang | G02B 27/0172 |
| 10,880,542 B1 * | 12/2020 | Rong | H04N 13/344 |
| 11,237,628 B1 | 2/2022 | Sharma et al. | |
| 11,307,654 B1 | 4/2022 | Zhang et al. | |
| 2014/0071400 A1 * | 3/2014 | Gao | G02B 17/0856 351/210 |
| 2018/0275409 A1 * | 9/2018 | Gao | H04N 13/332 |
| 2020/0400952 A1 * | 12/2020 | Jenkins | G02B 5/005 |

FOREIGN PATENT DOCUMENTS

| | | | | |
|---|---|---|---|---|
| GB | 2261279 A * | 5/1993 | | G02B 6/0006 |
| WO | WO-2018199972 A1 * | 11/2018 | | |

* cited by examiner

*Primary Examiner* — Kirk W Hermann
(74) *Attorney, Agent, or Firm* — Greenberg Traurig, LLP (57) ABSTRACT

An illumination optical component for a head mounted device includes an input aperture, an optical substrate, a hot mirror layer, and exit feature voids. The input aperture is configured to accept near-infrared light from a light source. The optical substrate has a refractive index. The hot mirror layer is disposed on the optical substrate. The hot mirror layer is configured to confine the near-infrared light to be recycled within the optical substrate and configured to pass visible light. The exit feature voids are patterned into an eye-side of the hot mirror layer. The exit feature voids are configured to illuminate an eyebox region with near-infrared illumination light.

20 Claims, 12 Drawing Sheets

HOT MIRROR OPTICAL CAVITY AND INFIELD ILLUMINATION

CROSS-REFERENCE TO RELATED APPLICATIONS

This application claims priority to U.S. Provisional Application No. 63/435,675 filed Dec. 28, 2022, which is hereby incorporated by reference.

TECHNICAL FIELD

This disclosure relates generally to optics, and in particular to optical cavities.

BACKGROUND INFORMATION

Eye tracking technology enables head mounted devices and other devices to interact with users based on the eye movement or eye orientation of the user. Example eye tracking techniques include capturing images of the eye and then performing image processing of the captured images to determine the movement or position of the eye.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a hot mirror optical cavity are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Some eye tracking applications benefit from illuminating the eyebox region with illumination light. In some implementations, the eyebox is defined by where an eye of a user may be at any given time and includes accommodation for glasses/headset slippage and eye gaze rotations. The illumination light may be near-infrared light. In the context of head mounted devices, illuminating the eyebox region with illumination light from in front of the eye (instead of at oblique angles) assists in capturing higher contrast images of the eye. Prior eye-tracking illumination systems have used around-the-lens illuminators such as LEDs or vertical-cavity surface emitting lasers (VCSELs) that are mounted on a frame of the headset. However, the relative oblique angle of the illumination light could be improved. In implementations of the disclosure, an optical component may be included in a lens of a head mounted device where an optical substrate confines light from a light source and then exit features of the optical component illuminate the eyebox region from in front of the eyebox region. These and other embodiments are described in more detail in connection with FIGS. 1-7.

Figure 1:
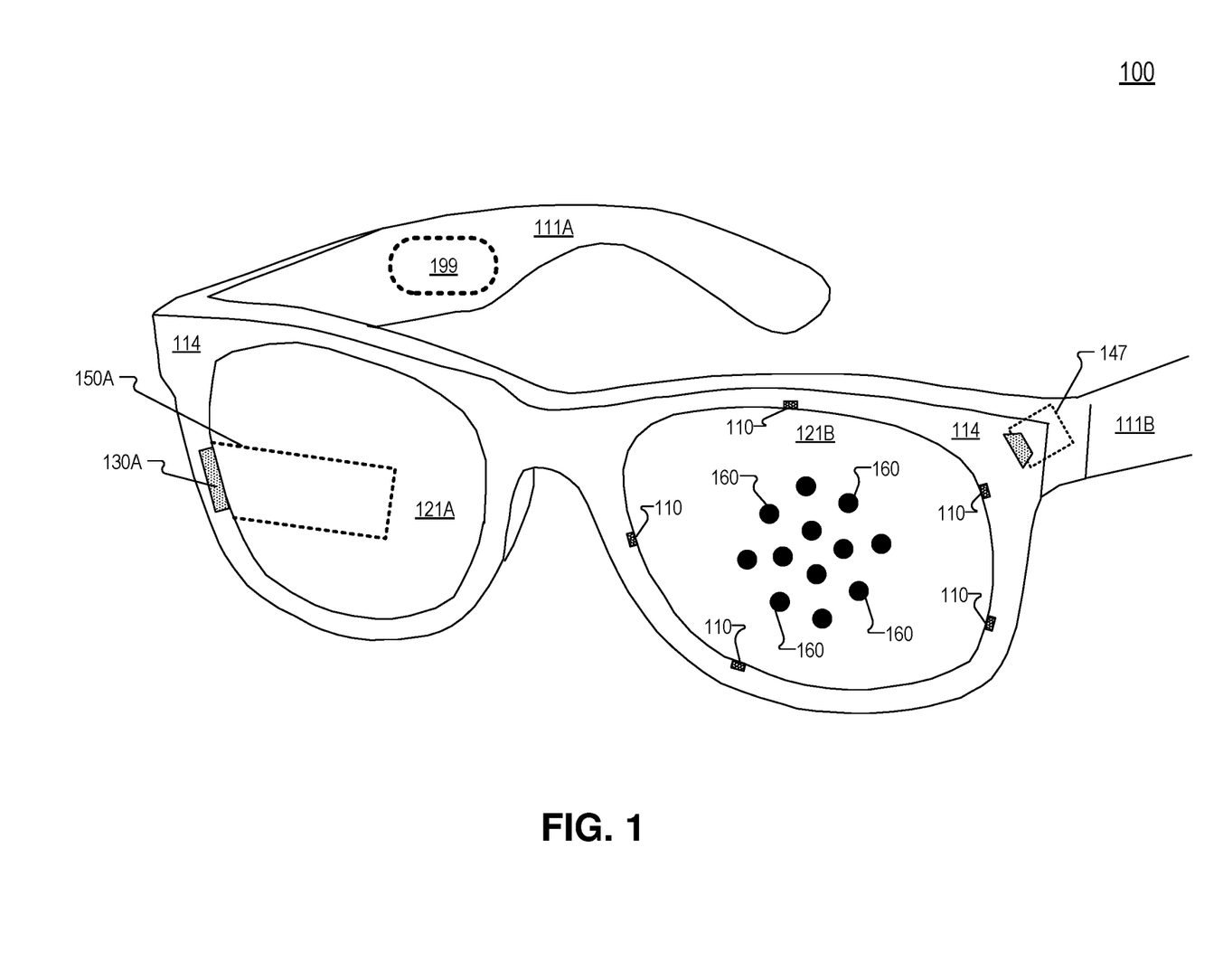
FIG. 1 illustrates a head mounted device that may include an illumination optical component, in accordance with aspects of the disclosure.

FIG. 1 illustrates a head mounted device 100 that may include an illumination optical component, in accordance with aspects of the present disclosure. Head mounted devices (e.g. smartglasses) that don't necessarily include a display may also utilize the illumination optical components disclosed herein. Head mounted device 100 includes frame 114 coupled to arms 111A and 111B. Lens assemblies 121A and 121B are mounted to frame 114. Lens assemblies 121A and 121B may include a prescription lens matched to a particular user of head mounted device 100. The illustrated head mounted device 100 is configured to be worn on or about a head of a wearer of the head mounted device 100.

In the head mounted device 100 illustrated in FIG. 1, lens assembly 121A includes a waveguide 150A to direct image light generated by a display 130A to an eyebox area for viewing by a user of head mounted device 100. Display 130A may include a liquid crystal display (LCD), an organic light emitting diode (OLED) display, micro-LED display, quantum dot display, pico-projector, a beam-scanning display, or liquid crystal on silicon (LCOS) display for directing image light to a wearer of head mounted device 100. While not specifically, lens assembly 121B may also include a waveguide to provide image light generated by a display to an eyebox area of the user.

Lens assemblies 121A and 121B may appear transparent to a user to facilitate augmented reality or mixed reality to enable a user to view scene light from the environment around them while also receiving image light directed to their eye(s) by, for example, waveguide 150A. Lens assembly 121A may include two or more optical layers for different functionalities such as display, eye-tracking, and optical power.

Frame 114 and arms 111 may include supporting hardware of head mounted device 100 such as processing logic 199, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, head mounted device 100 may be configured to receive wired power. In one embodiment, head mounted device 100 is configured to be powered by one or more batteries. In one embodiment, head mounted device 100 may be configured to receive wired data including video data via a wired communication channel. In one embodiment, head mounted device 100 is configured to receive wireless data including video data via a wireless communication channel.

FIG. 1 illustrates that lens assembly 121B includes an illumination optical component including exit feature voids that are "infield" in the sense that they would be in the field of view of a user of the head mounted device 100 as the user looks through lens assembly 121B. The exit feature voids are on an eye-side of the illumination optical component to illuminate the eyebox region with illumination light that may be near-infrared light. Camera 147 may then capture images of the eye in the eyebox region that is illuminated by the illumination light. FIG. 1 illustrates that light sources 110 may be configured to inject source light into the illumination optical component. The light sources 110 may be included in frame 114 in some implementations. Light sources 110 may be LEDs or VCSELs, for example. Light sources 110 may be configured to emit narrow-band near-infrared light (e.g. 850 nm or 940 nm).

Figure 2:
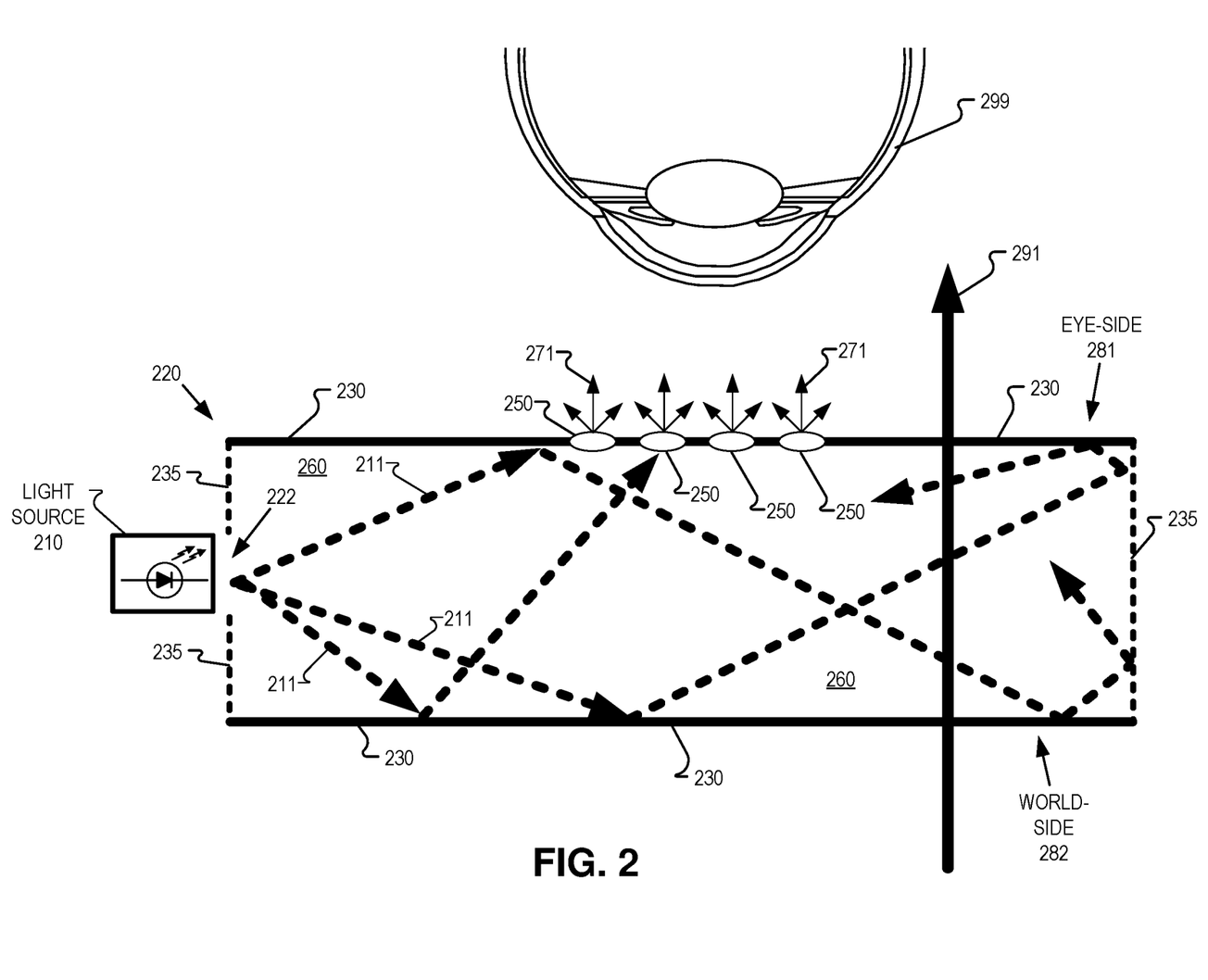
FIG. 2 illustrates a top view of a light source and an illumination optical component that may be utilized in a head mounted device, in accordance with aspects of the disclosure.

FIG. 2 illustrates a top view of a light source 210 and an illumination optical component 220 that may be utilized in a head mounted device, in accordance with aspects of the disclosure. The head mounted device may be smartglasses, AR glasses, an MR headset, and/or a VR headset. Illumination optical component 220 includes an input aperture 222, optical substrate 260, a hot mirror layer 230, and exit feature voids 250.

The light source 210 (e.g. light sources 110 in FIG. 1) emits near-infrared source light 211 (e.g. 850 nm or 940 nm) into an optical substrate 260 having a refractive index. In implementations, the refractive index is above 1.4. In implementations, the refractive index is between 1.4 and 1.8. Input aperture 222 is configured to accept the near-infrared source light 211 emitted by light source 210.

In FIG. 2, a hot mirror layer 230 (e.g. a dielectric reflector) is disposed on the optical substrate 260. The hot mirror layer 230 is configured to confine (via reflection) the near-infrared source light to be recycled within the optical substrate (as the near-infrared light is reflected by the hot mirror layer until escaping exit feature voids 250). The hot mirror layer 230 is also configured to pass visible light so that scene light 291 from a world-side 282 of the illumination optical component 220 can propagate through the illumination optical component 220 to the eye-side 281 and become incident on an eye 299 of a user that occupies an eyebox region. Hot mirror layer 230 may reflect a particular narrow-band near-infrared wavelength that is matched to a near-infrared light source 210. For example, if light source 210 emits source light centered around 850 nm, hot mirror layer 230 may be configured to reflect light between 845 nm and 855 nm and pass other wavelengths of light.

Exit feature voids 250 are patterned into the eye-side 281 of the hot mirror layer 230, in the illustrated implementation. The exit feature voids 250 are configured to illuminate the eyebox region with near-infrared illumination light 271. Hot mirror layer 230 is disposed on both the eye-side 281 and the world-side 282 of the optical substrate 260 of illumination optical component 220.

FIG. 2 also illustrates that an annulus layer 235 is disposed around a thickness of the optical substrate 260. The annulus layer 235 is configured to reflect the near-infrared source light 211, in the illustrated implementation. Annulus layer 235 may be a mirrored layer (reflecting visible light and near-infrared light) or may be made of a hot mirror layer that has similar characteristics to hot mirror layer 230. The hot mirror layer 230 combined with the annulus layer 235 may form a near-infrared optical cavity to confine and reflect the near-infrared source light 211 until it exits as near-infrared illumination light 271 to illuminate the eyebox region.

Figure 3A:
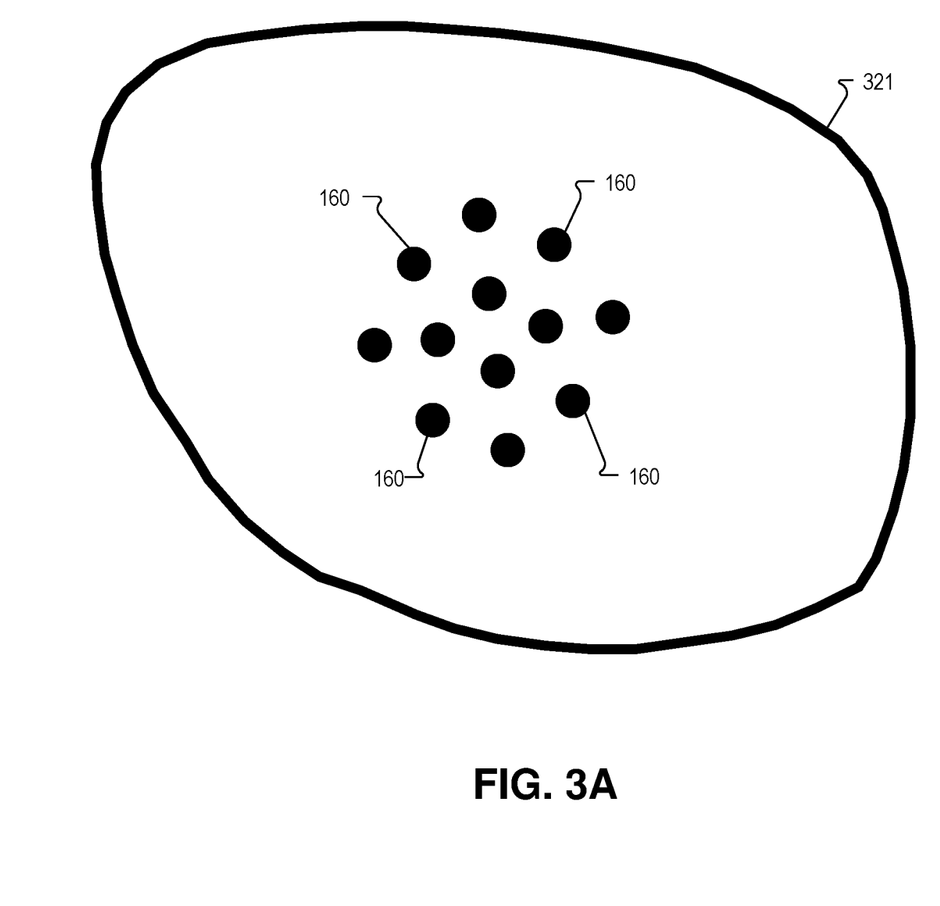
FIGS. 3A-3C illustrate example views of a lens that may be secured by a frame of a head mounted device, in accordance with aspects of the disclosure.

FIG. 3A illustrates example views of a lens 321 that may be secured by a frame (not particularly illustrated) of a head mounted device. Lens 321 may include the illumination optical component 220 of FIG. 2. FIG. 3A illustrates example round exit feature voids 160 as an example shape of exit feature voids and an example pattern of exit feature voids in relation to each other. Other shapes of the exit feature voids 160 and arrangements of the exit feature voids 160 are contemplated.

Figure 3B:
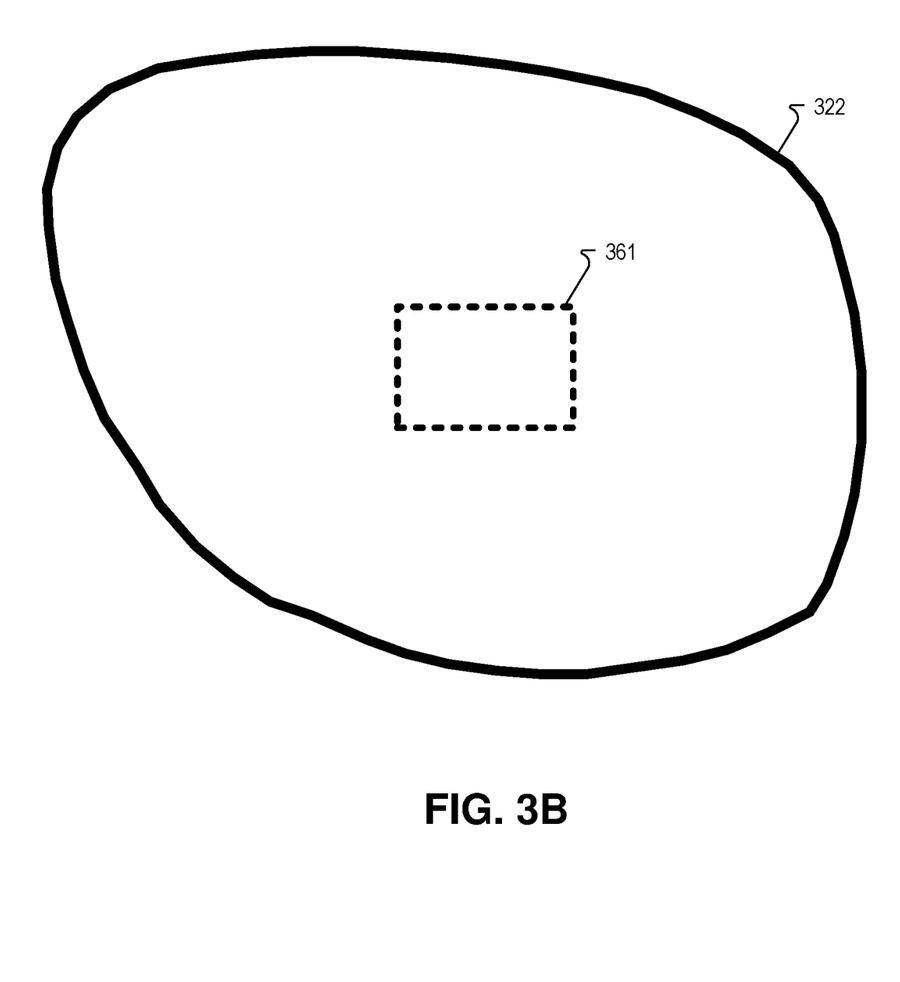

FIG. 3B illustrates example views of a lens 322 that may be secured by a frame (not particularly illustrated) of a head mounted device. Lens 322 may include the illumination optical component 220 of FIG. 2 except that the multiple exit feature voids are replaced with a rectangular or pseudo-rectangular void 361. The rectangular or pseudo-rectangular void 361 may be configured to be centered in the middle of the eyebox. While the rectangular or pseudo-rectangular void 361 does not emit spatial illumination light, it increases the uniformity of the illumination light directed to the eyebox.

Figure 3C:
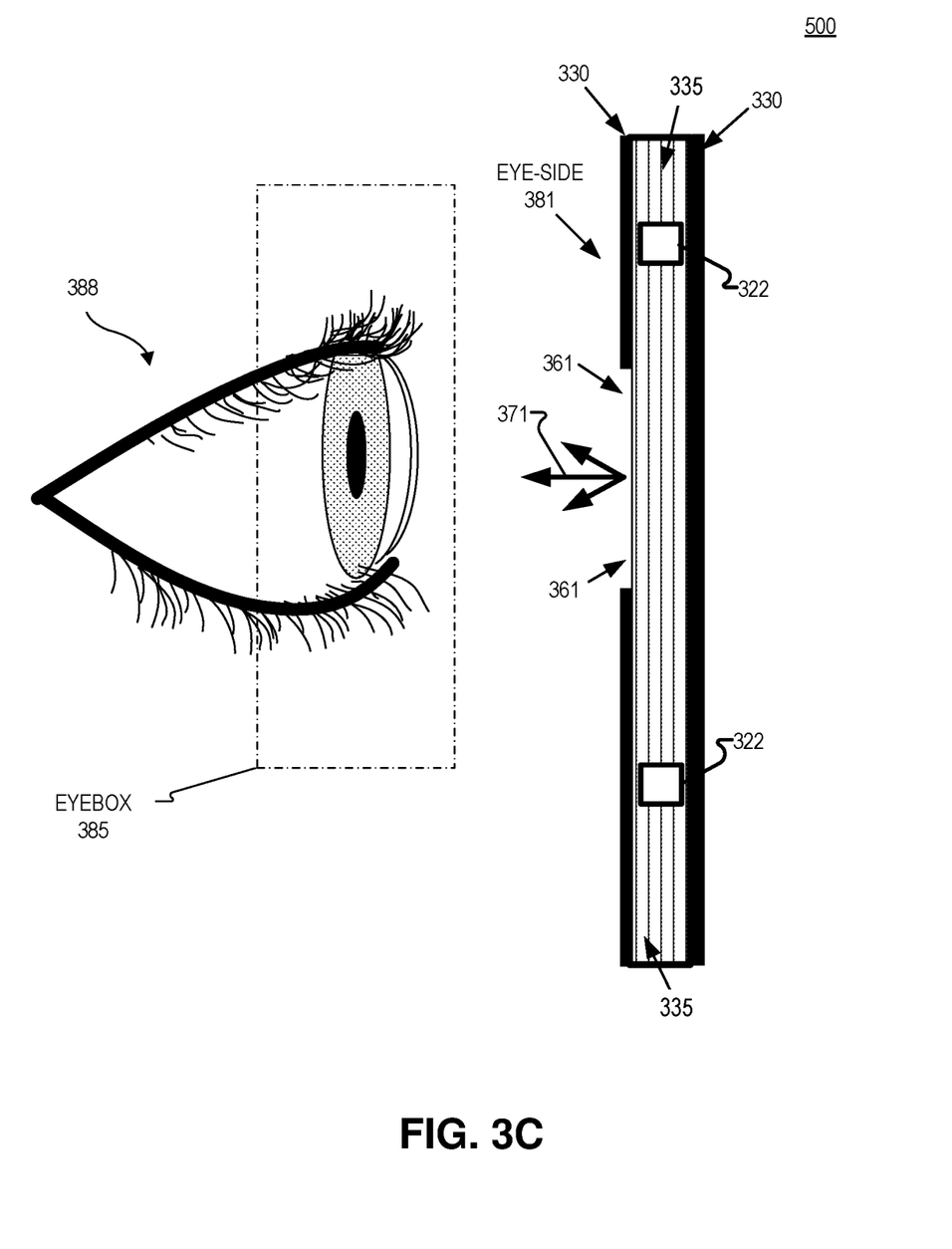

FIG. 3C illustrates a side view of optical structure 300 as an illumination optical component. In FIG. 3C, rectangular or pseudo-rectangular void 361 has been removed from a hot mirror layer 330 on an eye-side 381 of optical structure 300.

Void 361 effects "infield" illumination since they are positioned to illuminate an eye 388 in eyebox region 385 with illumination light 371 while being in the field of view of a user of a head mounted device. FIG. 3C also illustrates input apertures 322 formed in annulus layer 335. Input aperture 322 is configured to receive near-infrared light from a light source to incouple the light into the optical substrate (e.g. optical substrate 260).

Figure 4A:
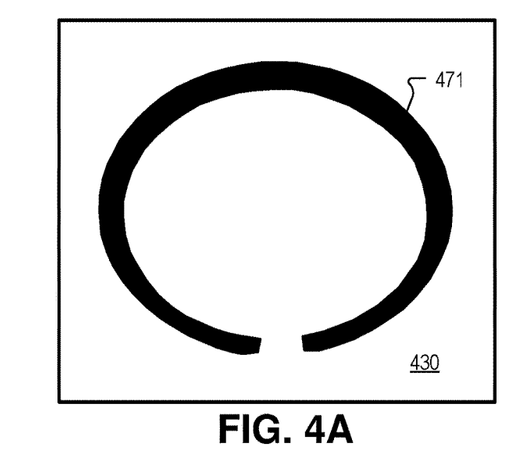
FIGS. 4A-4D illustrate example illumination shapes/patterns of exit feature voids, in accordance with aspects of the disclosure.
Figure 4B:
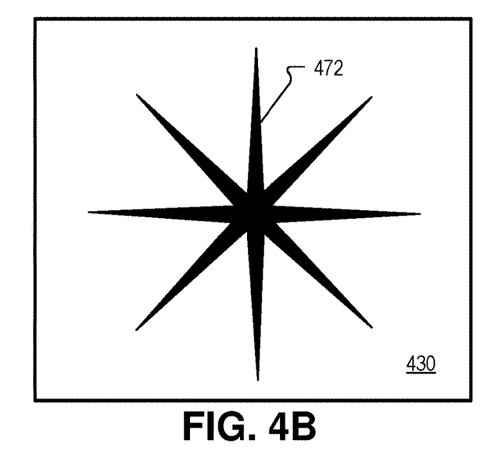
Figure 4C:
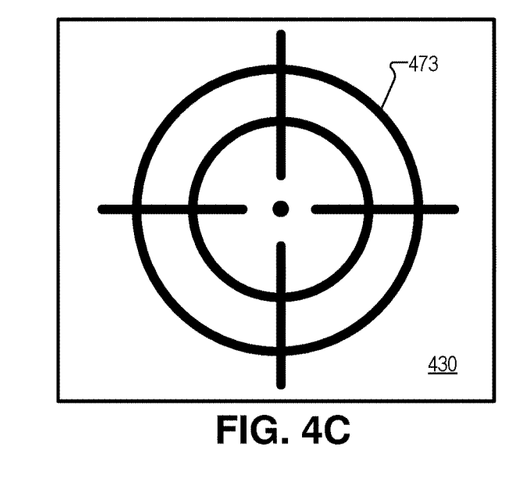
Figure 4D:
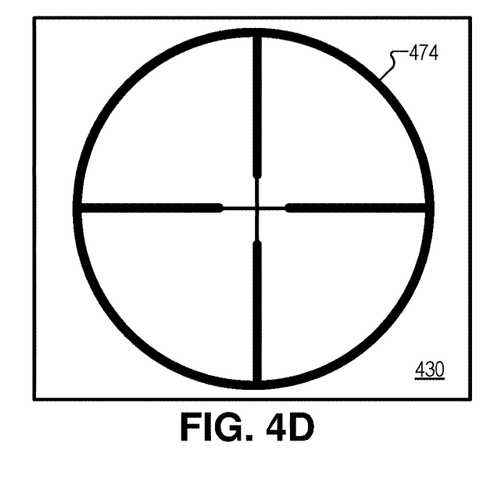

FIGS. 4A-4D illustrate example illumination shapes/patterns of the exit feature voids 160/270, in accordance with aspects of the disclosure. FIG. 4A illustrates a halo-shaped exit feature void 471 patterned into a hot mirror layer 430. FIG. 4B illustrates a star-shaped exit feature void 472 patterned into a hot mirror layer 430. FIG. 4B shows an 8-point star, although different star patterns are contemplated. FIG. 4C illustrates a crosshair-shaped exit feature void 473 patterned into a hot mirror layer 430. FIG. 4D illustrates a reticle-shaped exit feature void 474 patterned into hot mirror layer 430. The example exit feature voids 471, 472, 473, and 474 emit spatial light structures as illumination light that are considered structured light. Those skilled in the art appreciate that the different exit feature voids may be designed in different two-dimensional shapes and emit different spatial structures of illumination light. The patterns illustrated in FIGS. 4A-4D may be etched into a hot mirror layer using a subtractive process or the hot mirror layer may be deposited while the exit feature voids are masked so that the hot mirror layer deposition does not get deposited on the exit feature voids.

FIGS. 5A-5F illustrate an example fabrication process for an illumination optical component that includes a subtractive process to form the exit feature voids, in accordance with aspects of the disclosure.

Figure 5A:
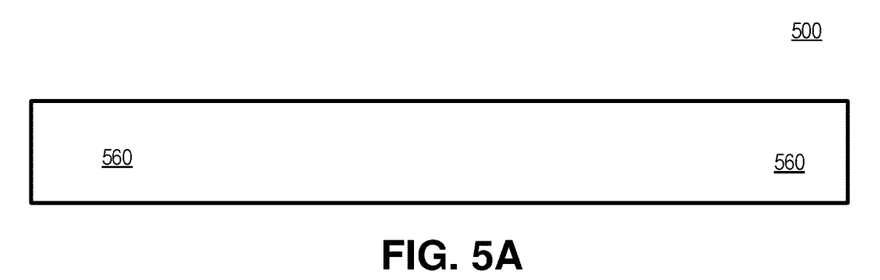
FIGS. 5A-5F illustrate an example fabrication process for an illumination optical component that includes a subtractive process to form the exit feature voids, in accordance with aspects of the disclosure.

FIG. 5A illustrates a top view of optical structure 500 including an optical substrate 560. Optical substrate 560 may be shaped as a lens to be included in a lens assembly 121A/B. Optical substrate 560 has a refractive index. Optical substrate 560 may be glass or plastic.

Figure 5B:
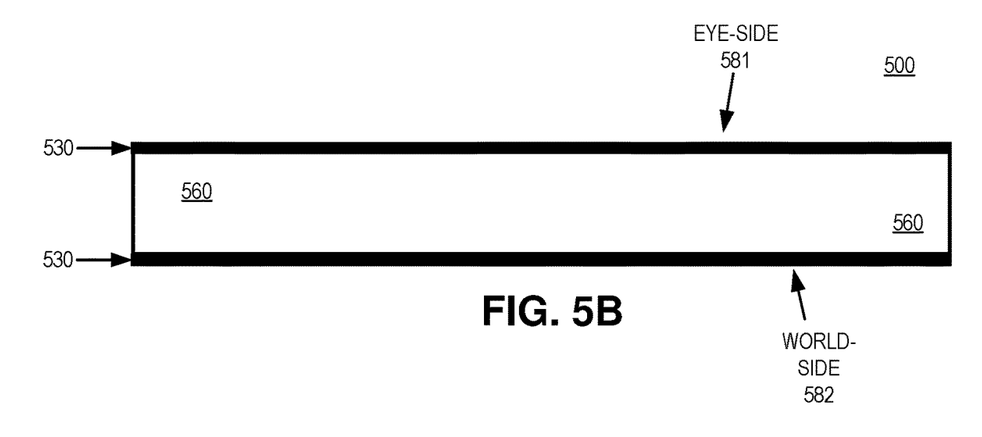

In FIG. 5B, a hot mirror layer 530 is formed on an eye-side of optical substrate 560 and on a world-side 582 of optical substrate 560. In some implementations, hot mirror layer 530 is deposited onto optical substrate 560. In some implementations, hot mirror layer 530 is a dielectric layer. Hot mirror layer 530 is configured to reflect a near-infrared wavelength of near-infrared light and pass visible light. This configuration allows scene light from the external world and/or display light from a near-eye display to propagate through optical structure 500.

Figure 5C:
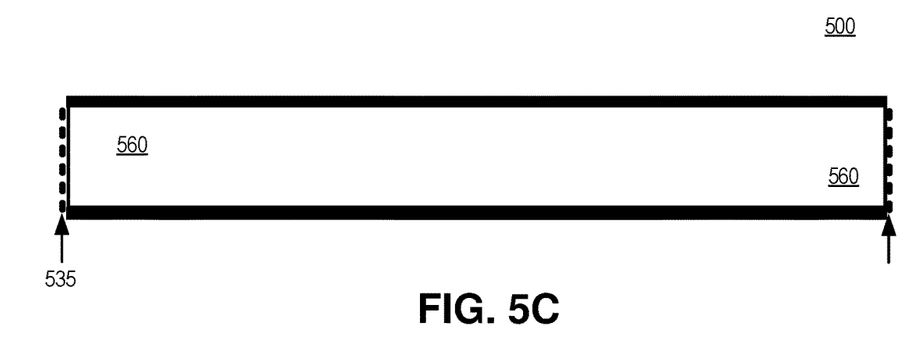

In FIG. 5C, an annulus layer 535 is formed around a thickness of optical substrate 560. Annulus layer 535 reflects the near-infrared light to confine the near-infrared light to the optical substrate 560. Annulus layer 535 may be formed from the same hot mirror layer that is used to form hot mirror layer 530. In some implementations, annulus layer 535 is a mirror since passing visible light through annulus layer 535 is less important than passing visible light through hot mirror layer 530.

Figure 5D:
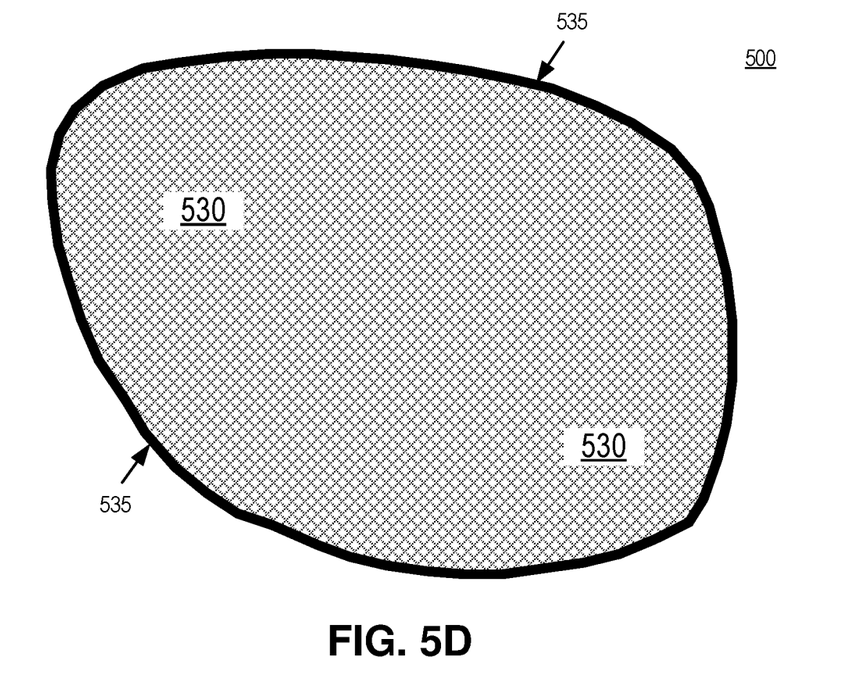

FIG. 5D illustrates a front view of optical structure 500 being shaped as a lens where hot mirror layer 530 is formed on the eye-side 581 and the annulus layer 535 is formed around the annulus of the lens shaped optical structure 500.

Figure 5E:
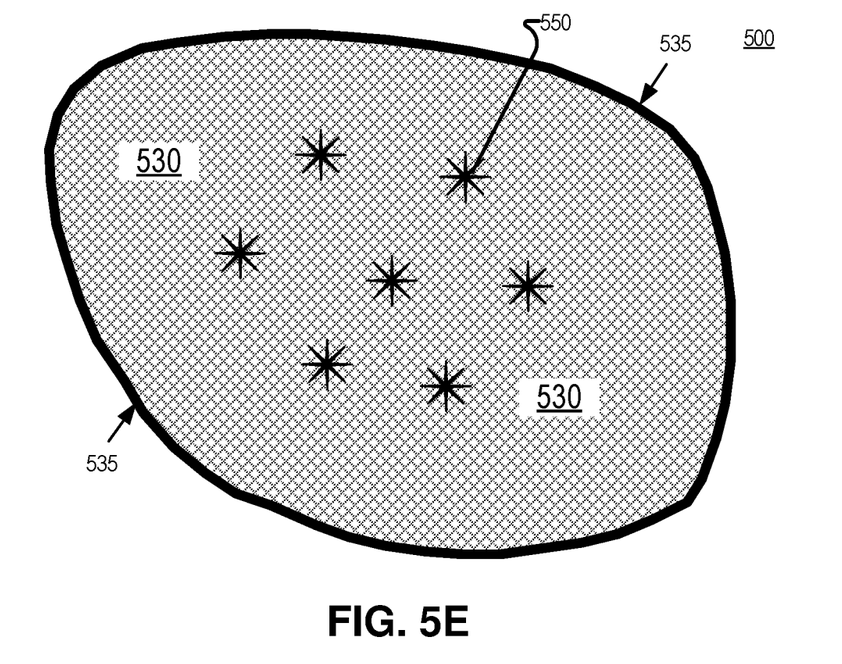

FIG. 5E illustrates forming exit feature voids 550 on an eye-side 581 of hot mirror layer 530 to allow near-infrared light propagating within optical substrate 560 to exit the optical substrate 560 as near-infrared illumination light. In FIG. 5E, exit feature voids 550 are star-shaped, although other shapes may be used.

Figure 5F:
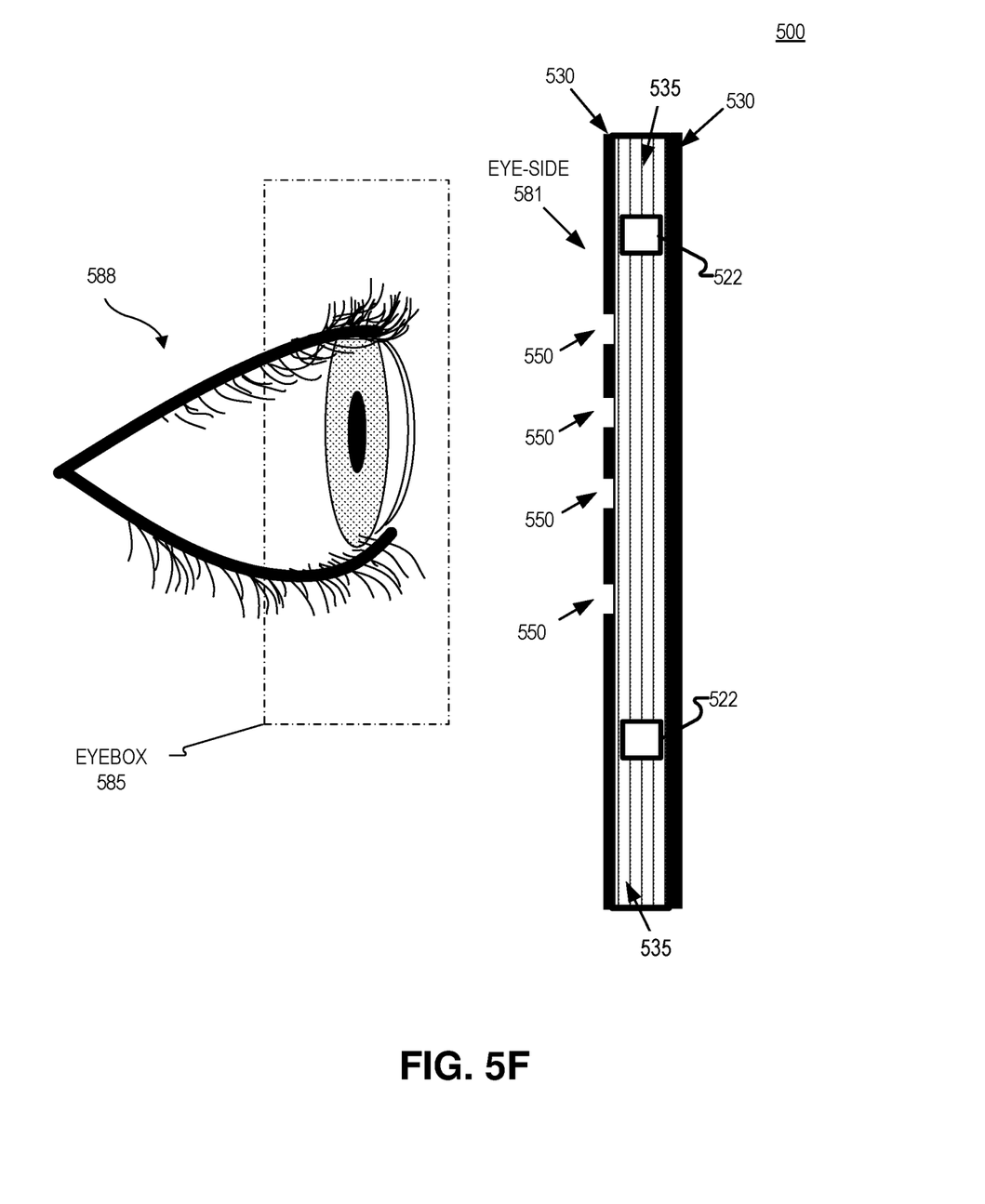

FIG. 5F illustrates a side view of optical structure 500 as an illumination optical component. In FIG. 5F, exit feature voids 550 have been removed from hot mirror layer 530 on an eye-side 581 of optical structure 500. The exit feature voids 550 effect "infield" illumination since they are positioned to illuminate an eye 588 in eyebox region 585 while being in the field of view of a user of a head mounted device. FIG. 5F also illustrates input apertures 522 formed in annulus layer 535. Input aperture 522 is configured to receive near-infrared light from a light source to incouple the light into optical substrate 560.

FIGS. 6A-6F illustrate an example fabrication process for an illumination optical component that includes a masking process to form exit feature voids, in accordance with aspects of the disclosure.

Figure 6A:
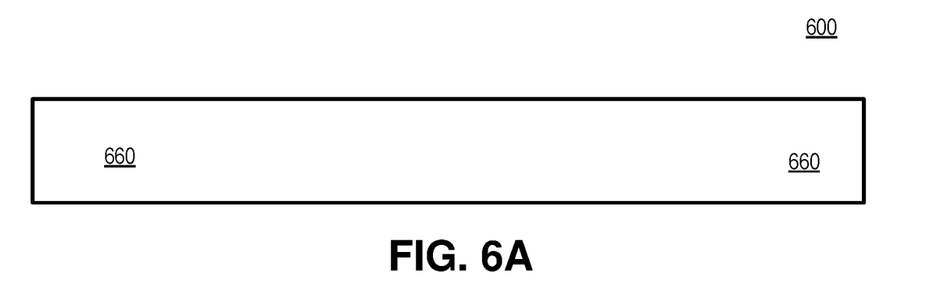
FIGS. 6A-6F illustrate an example fabrication process for an illumination optical component that includes a masking process to form exit feature voids, in accordance with aspects of the disclosure.

FIG. 6A illustrates a top view of optical structure 600 including an optical substrate 660. Optical substrate 660 may be shaped as a lens to be included in a lens assembly 121A/B. Optical substrate 660 has a refractive index. Optical substrate 660 may be glass or plastic.

Figure 6B:
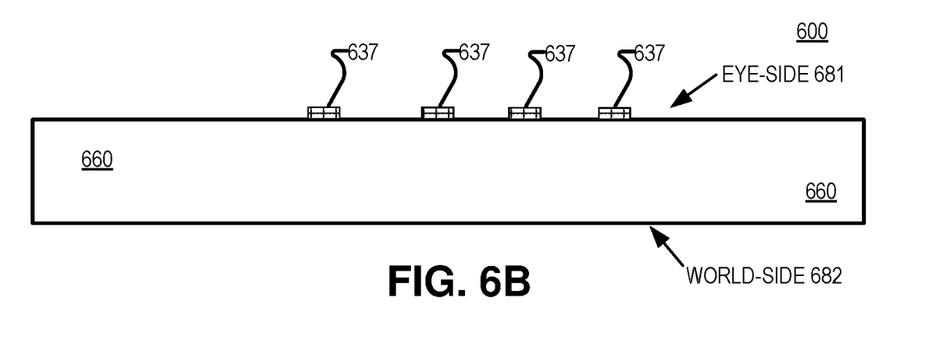

In FIG. 6B, masking portions 637 shaped like the eventual exit feature voids are formed on the eye-side 681 of the optical substrate. The eye-side 681 is disposed opposite of world-side 682.

Figure 6C:
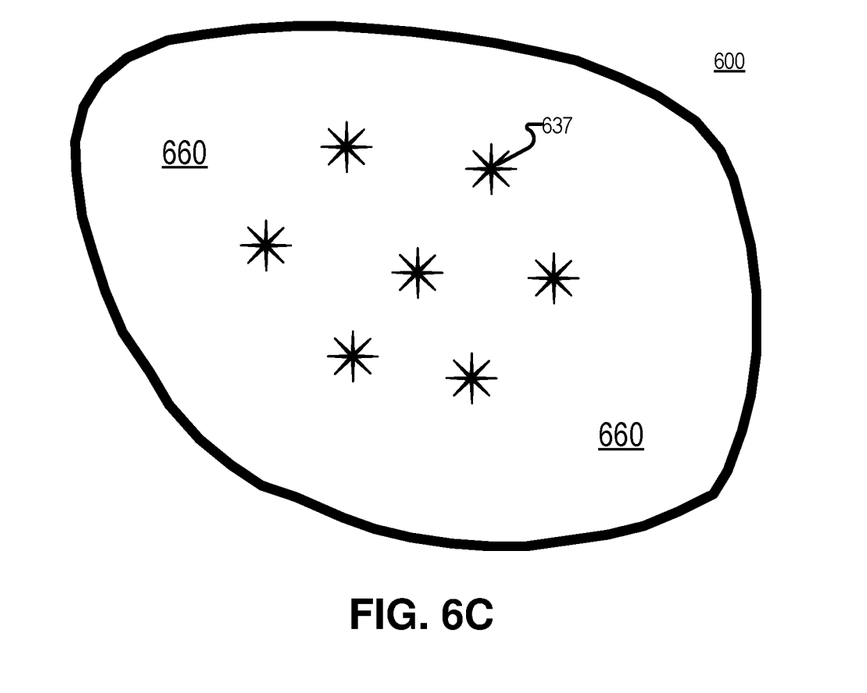

FIG. 6C illustrates a front view of optical structure 500 shaped as a lens having example masking portions 637 being star-shaped.

Figure 6D:
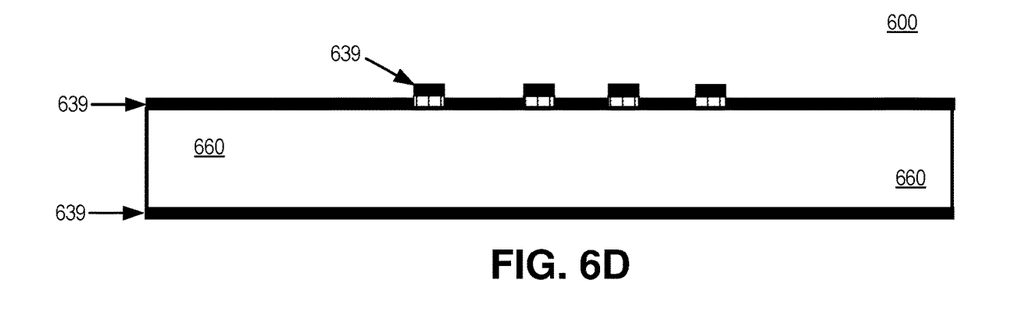

FIG. 6D illustrates a top view of a hot mirror layer 639 being formed (e.g. deposited) over optical substrate 660 and over masked portions 637. Masking portions 637 prevent portions of optical substrate 660 from receiving the deposition of hot mirror layer 639.

Figure 6E:
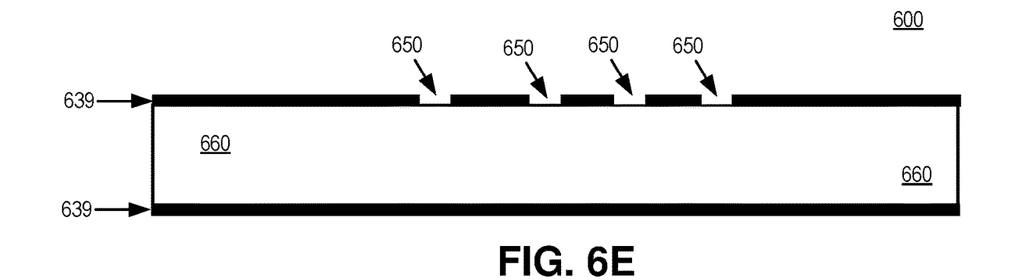

In FIG. 6E, masked portions 637 are removed to leave the exit feature voids 650 that are shaped to however masking portions 637 were shaped. Removing masked portions 637 may include a wet-etching technique, in some implementations.

Figure 6F:
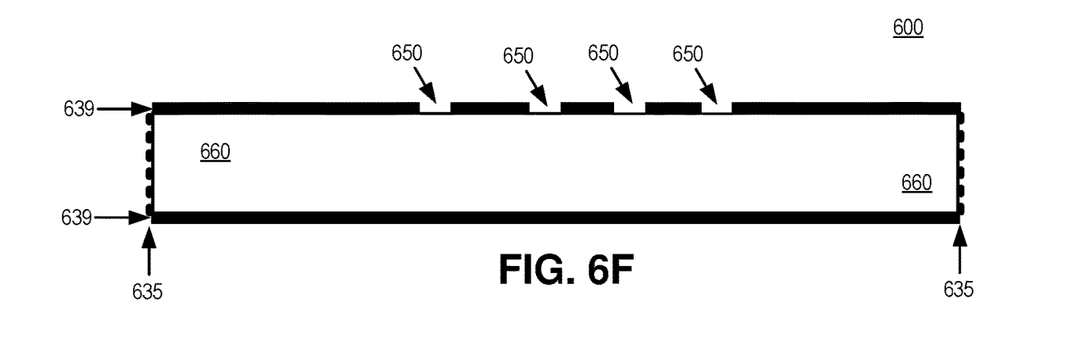

FIG. 6F illustrates an annulus layer 635 formed around a thickness of optical substrate 660. Annulus layer 635 reflects the near-infrared light to confine the near-infrared light to the optical substrate 660. Annulus layer 635 may be formed from the same hot mirror layer that is used to form hot mirror layer 630. In some implementations, annulus layer 635 is a mirror since passing visible light through annulus layer 635 is less important than passing visible light through hot mirror layer 630.

Figure 7:
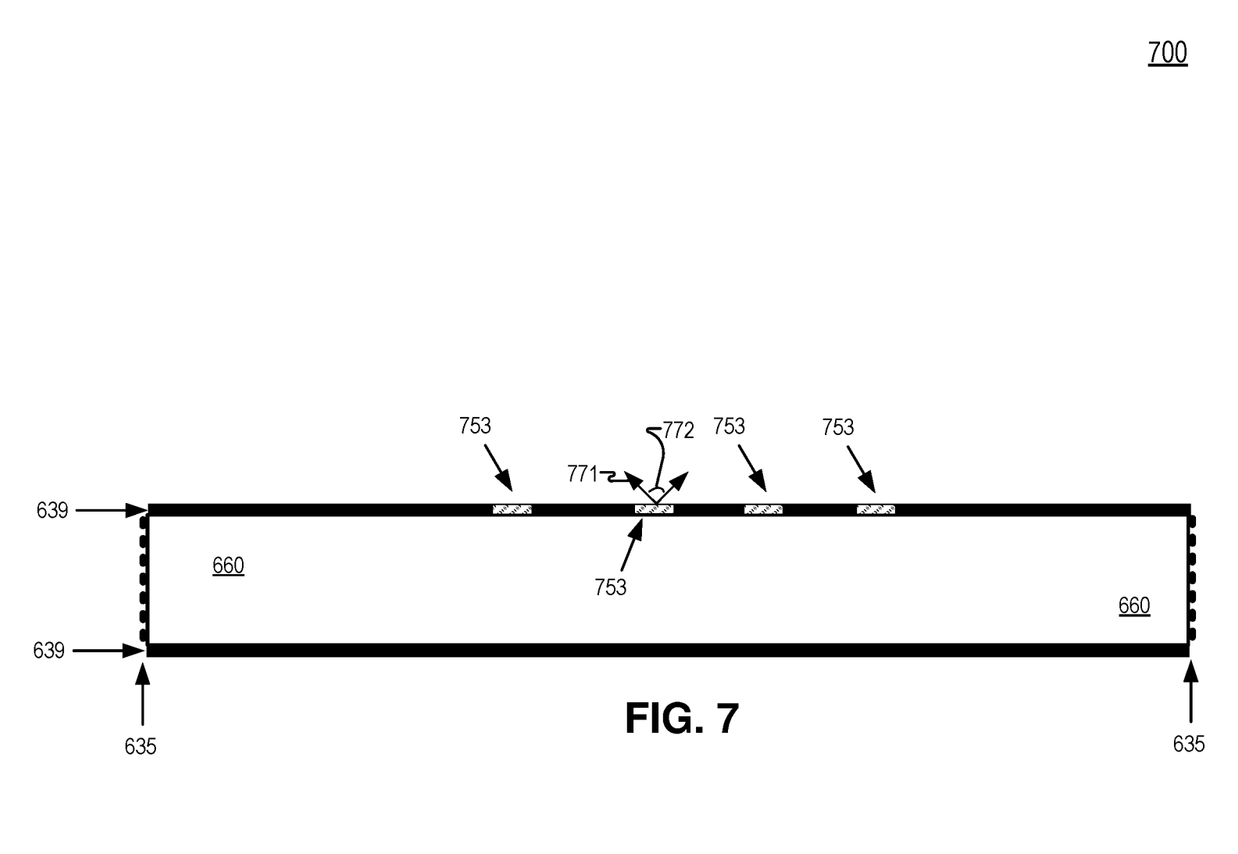
FIG. 7 illustrates an illumination optical component including anti-reflective (AR) coating portions disposed in exit feature voids, in accordance with aspects of the disclosure.

FIG. 7 illustrates an illumination optical component including anti-reflective (AR) coating portions 753 disposed in the exit feature voids, in accordance with aspects of the disclosure. The AR coating portions 753 have a second refractive index that is different from the refractive index of optical substrate 660. The second refractive index of AR coating portions 753 is between the refractive index of optical substrate 660 and air (~1). The second refractive index may be tuned to control the output angle 772 of the near-infrared illumination light 771 exiting from the exit feature voids of illumination optical component 700 (due to Total Internal Reflection).

The output angle 772 of the illumination light 771 will depend on the refractive index of optical substrate 660 and the second refractive index of AR coating portions 753. The refractive index of optical substrate 660 may be between 1.4 and 1.8. In an implementation, the second refractive index of the AR coating portions 753 is below 1.5. In an implementation, the output angle 772 is approximately 70 degrees. In an implementation, the output angle 772 is approximately 60 degrees.

In some implementations of the disclosure, exit feature voids in the hot mirror layer are formed by adding a material or coating of a different refractive index (e.g. index matching/transition fluids/adhesives) in specified locations to change the performance of the hot mirror layer at the specified locations to allow the near-infrared light to leak out as the near-infrared illumination light 271.

The benefits of implementations of the disclosure are numerous. Among the benefits is a potential reduction in light sources to fully illuminate the eyebox compared with prior solutions. For example, in some implementations, only one or two light sources 210 may be need to supply the source light 211. Secondly, infield electrical routing required to facilitate in-field light sources can be eliminated compared to prior solutions where in-field light sources were placed in/on the lens and electrical wires were routed to power the in-field light sources. The electrical wires, depending on size, are not fully transparent and may cause optical aberrations or be visible to outside observers. Yet another benefit of implementations of the disclosure includes the ability to precisely define the illumination light output shape by using existing complementary metal-oxide semiconductor (CMOS) techniques to precisely define the shape and size of the exit feature voids. In contrast, aligning optics over an infield LED is more difficult and expensive to build and fabricate and generally less accurate for light shaping. Using existing semiconductor techniques, implementations of the disclosure can pattern smaller and more precise exit features.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An illumination optical component comprising:
    an input aperture to accept near-infrared light from a light source;
    an optical substrate having a refractive index;
    a hot mirror layer disposed on the optical substrate, wherein the hot mirror layer is configured to confine the near-infrared light to be recycled within the optical substrate and configured to pass visible light; and
    exit feature voids patterned into the hot mirror layer on an eye-side of the hot mirror layer, wherein the exit feature voids are configured to illuminate an eyebox region with near-infrared illumination light.

2. A head mounted device comprising:
    a light source configured to emit near-infrared light; and
    an illumination optical component including:
        an input aperture to accept the near-infrared light from the light source;
        an optical substrate having a refractive index;
        a hot mirror layer disposed on the optical substrate, wherein the hot mirror layer is configured to confine the near-infrared light to be recycled within the optical substrate including reflecting a portion of the near-infrared light away from an eyebox region, and wherein the hot mirror layer is configured to pass visible light; and
        exit feature voids patterned into an eye-side of the hot mirror layer, wherein the exit feature voids are configured to illuminate the eyebox region with near-infrared illumination light.

3. The head mounted device of claim 2, wherein the exit feature voids in the hot mirror layer are shaped as at least one of a halo, a star, a crosshair, or a reticle.

4. The head mounted device of claim 2, wherein the exit feature voids in the hot mirror layer are formed using a subtractive process that removes portions of the hot mirror layer.

5. The head mounted device of claim 2, wherein the exit feature voids in the hot mirror layer are formed by depositing the hot mirror layer onto the optical substrate and masking the exit feature voids from receiving the deposition of the hot mirror layer.

6. The head mounted device of claim 2, wherein the exit feature voids in the hot mirror layer are formed by adding a material or coating of a different refractive index in specified locations to change a reflection performance of the hot mirror layer at the specified locations to allow the near-infrared light to leak out as the near-infrared illumination light.

7. The head mounted device of claim 2 further comprising:
    an annulus layer disposed around a thickness of the optical substrate, wherein the annulus layer is configured to reflect the near-infrared light to confine the near-infrared light to be recycled within the optical substrate.

8. The head mounted device of claim 7, wherein the input aperture to receive the near-infrared light from the light source is a void in the annulus layer.

9. The head mounted device of claim 2, wherein a size of the exit feature voids is sized to the refractive index to control an emission angle of the near-infrared illumination light.

10. The head mounted device of claim 2, wherein the illumination optical component further includes anti-reflective (AR) coating portions disposed in the exit feature voids, wherein a second refractive index of the AR coating portions is configured to tune an output angle of the near-infrared illumination light exiting from the exit feature voids.

11. The head mounted device of claim 2 further comprising:
    a frame to secure the head mounted device to a head of a user; and
    a lens secured by the frame within a field of view (FOV) of the user, wherein the illumination optical component is included in the lens.

12. The head mounted device of claim 2, wherein the refractive index is above 1.4.

13. The head mounted device of claim 2, wherein the hot mirror layer includes a world side disposed opposite the eye-side of the hot mirror layer, the optical substrate disposed between the world side of the eye-side layer and the eye-side of the hot mirror layer, and wherein the world side is completely covered by the hot mirror layer.

14. The head mounted device of claim 2, wherein the light source is configured to emit the near-infrared light at a central wavelength, and wherein the hot mirror layer is configured to reflect a bandwidth around the central wavelength while passing other near-infrared light outside the bandwidth.

15. The head mounted device of claim 2, wherein the light source includes a laser or an LED.

16. The head mounted device of claim 2 further comprising:
    a frame to secure the head mounted device to a head of a user, wherein the light source is disposed in the frame.

17. A method of fabricating an illumination optical component, the method comprising:
    forming a hot mirror layer on an eye-side of an optical substrate and on a world-side of the optical substrate, wherein the hot mirror layer is configured to reflect a near-infrared wavelength of near-infrared light and pass visible light, and wherein the eye-side of the hot mirror layer reflects the near-infrared light away from an eyebox region;
    forming an annulus layer around a thickness of the optical substrate, wherein the annulus layer reflects the near-infrared light to confine the near-infrared light to the optical substrate; and
    forming at least one exit feature void on an eye-side of optical substrate to allow the near-infrared light propagating within the optical substrate to exit the optical substrate as near-infrared illumination light.

18. The method of claim 17, wherein forming the at least one exit feature void in the hot mirror layer includes removing a portion of the hot mirror layer in a subtractive process.

19. The method of claim 17, wherein the subtractive process includes etching.

20. The method of claim 17, wherein forming the at least one exit feature void in the hot mirror layer includes masking portions of the optical substrate from receiving a deposition of the hot mirror layer, wherein the deposition of the hot mirror layer is deposited on a remainder of the eye-side of the optical substrate that is unmasked,
    and wherein forming the at least one exit feature void in the hot mirror layer includes removing a mask that covered the at least one exit feature void.

\* \* \* \* \*